[11] 3,600,098

[72] Inventor  Richard C. Mohrman
                Irondequoit, N.Y.
[21] Appl. No. 888,641
[22] Filed     Dec. 29, 1969
[45] Patented  Aug. 17, 1971
[73] Assignee  Bausch & Lomb Incorporated
                Rochester, N.Y.

[54] OPTICAL ALIGNMENT METHOD AND APPARATUS
     5 Claims, 7 Drawing Figs.

[52] U.S. Cl. .................................. 356/153,
                                          351/6, 356/127
[51] Int. Cl. .................................. G01b 11/27
[50] Field of Search .......................... 356/138,
                                  153, 124, 127; 351/6, 7

[56]             References Cited
              UNITED STATES PATENTS
| | | | |
|---|---|---|---|
| 2,478,609 | 8/1949 | Townsley | 356/127 |
| 2,577,807 | 12/1951 | Pryor | 356/153 |
| 2,759,393 | 8/1956 | McLeod | 356/138 |
| 3,107,270 | 10/1963 | Hilderbrand | 350/10 |
| 3,248,162 | 4/1966 | Knoll | 351/6 |
| 3,259,039 | 7/1966 | Okajima | 351/7 |
| 3,507,597 | 4/1970 | Brockway et al. | 356/124 |

*Primary Examiner*—Ronald L. Wibert
*Assistant Examiner*—J. Rothenberg
*Attorney*—Frank C. Parker ABSTRACT: Rays emanating from a point light source are incident, respectively, upon peripheral, intermediate, and paracentral zones of a lens chosen for a high degree of spherical aberration. A small aperture stop, which may be the pupil of an observer's eye, is placed substantially in the focal plane of said peripheral rays, thereby blocking out the intermediate rays and passing both the peripheral rays, which subsequently form an annular image, and the paracentral rays, which subsequently form an image of the point source. Between the aberrating lens and the aperture stop, the rays are reflected from a specular surface which is known to have a perpendicular relationship to an optical axis sought to be aligned. For example, the corneal surface of an ophthalmic patient's eye might be the specular surface, where the optical axis of said eye is sought to be aligned to the optical axis of an analytical instrument. By arranging the light source, the aberrating lens and the aperture stop in fixed relationship to an optical axis and maintaining the fixed unity of the source, lens, stop and axis while varying their position relative to that of the specular surface until the point image is brought to the center of the annular image, the two optical axes are aligned to one another.

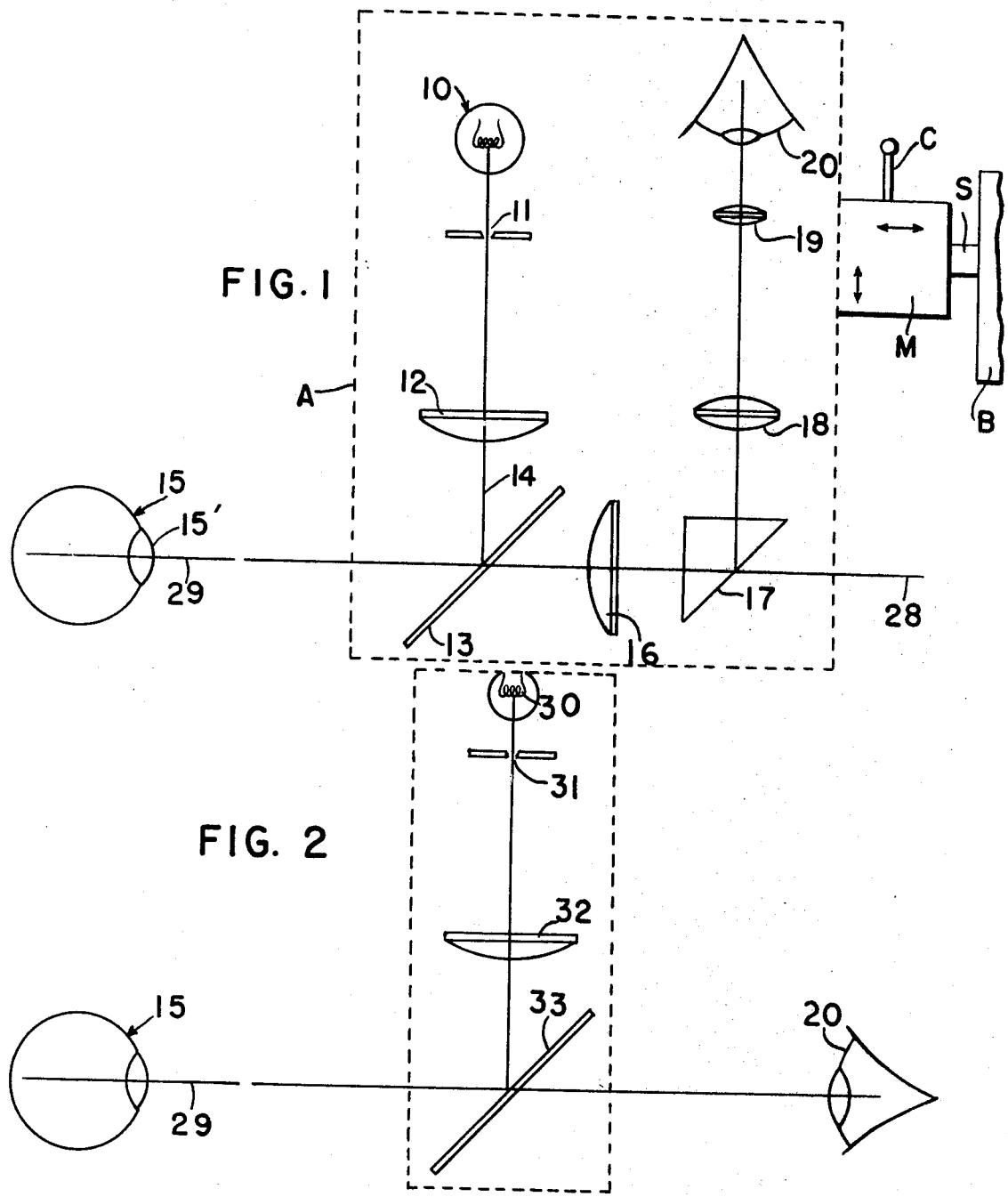

OPTICAL ALIGNMENT METHOD AND APPARATUS

BACKGROUND OF THE INVENTION

This invention is related to optical alignment apparatus and is more particularly concerned primarily with apparatus for optically aligning an optical instrument with a lens system, either organic or inorganic.

With regard to the description of the present invention, it will be heavily biased in favor of optically aligning organic lenses, namely, the living eye. However, reference will be had to the use of subject invention for aligning inorganic optical systems; e.g. glass optical elements.

With regard to the prior art, U.S. Pat. No. 3,136,839, issued to Aran Safir, June 6, 1964, describes apparatus for objectively testing an optical system, more particularly a human eye. This apparatus is commonly termed an electronic retinoscope when the teachings are directed toward testing of an eye.

In electronic retinoscopes, the subject lens system; i.e., the living eye, is periodically scanned with radiant energy, generally a beam of light. The reflex or reflection of the scanning beam off the retina of the eye is impinged on a set of photodetectors which are equally spaced at either side of a prescribed optical axis. The resulting signals from the photodetectors are then electronically evaluated relative to the position of the scanning beam to determine the various refractive characteristics of the subject eye.

However, for the electronic retinoscope to determine accurately these various refractive characteristics of the subject eye, several conditions must necessarily exist. The visual axis of the eye is not accurately aligned with the optical axis of the electronic retinoscope. If the visual axis of the eye is not accurately aligned with the retinoscope, erroneous results may occur.

The apparatus described in the aforementioned patent assumes the coincidence of the visual axis and the optical axis of the instrument. As stated above, this condition is paramount in importance and as a practical matter, cannot be assumed to exist. Provision of attaining and maintaining this condition precisely and quickly must be incorporated in a operative electronic retinoscope.

SUMMARY OF THE INVENTION

Accordingly, it is an object of the present invention to provide apparatus which will align an optical axis of a lens element or system precisely with the optical axis of an optical instrument.

A second object of the invention is to provide such an apparatus which will align the visual axis of a subject living eye with the optical axis of an electronic retinoscope.

Another object of the invention is to provide such an apparatus which may be easily removed from the optical axis of the instrument when the alignment is complete so that examination may commence.

A further object of the invention is to provide such an apparatus which can perform the alignment quickly and with no discomfort to the subject.

A still further object of the invention relating to such apparatus including inorganic lenses is to provide apparatus for quickly and precisely aligning the lens elements or systems with an optical instrument involving a minimum of operator skill.

Briefly, the invention in its broadest aspect envisions an apparatus for accurately aligning the optical axis of an optical system with a prescribed optical axis. The apparatus comprises a small source of light, lens means exhibiting spherical aberration for directing the rays from this source upon the surface of an eye and directing the reflection therefrom toward an optical system, the axis of which is to be aligned. A periscopic optical system is provided which is movable with respect to the prescribed optical axis for viewing the rays which are reflected back by the eye. Means are provided for adjusting the relative position of the pair of optical axes in order to bring said pair of optical axes into precise alignment.

Further objects, advantages, and features of the invention will be apparent in the arrangement and construction of the constituent parts in detail as set forth in the following specification taken together with the accompanying drawings.

DESCRIPTION OF THE DRAWINGS

In the drawings,

FIG. 1 is a schematic view of the preferred embodiment of the invention for aligning an instrument to the visual axis of a living eye, FIG. 2 is a schematic view of a simpler form of the invention for aligning an instrument to the visual axis of a living eye.

It should be noted that in all embodiments described, the human eye to which an instrument is being aligned can also represent certain types of inanimate lenses and lens systems.

DETAILED DESCRIPTION OF THE PREFERRED EMBODIMENT

Referring to FIG. 1 of the drawings, a light source 10 is placed so as to illuminate a small, round aperture 11 so as to produce a secondary light source. A lens 12 is positioned so that its optical axis is coincident with the center of the aperture 11.

Figure 3:
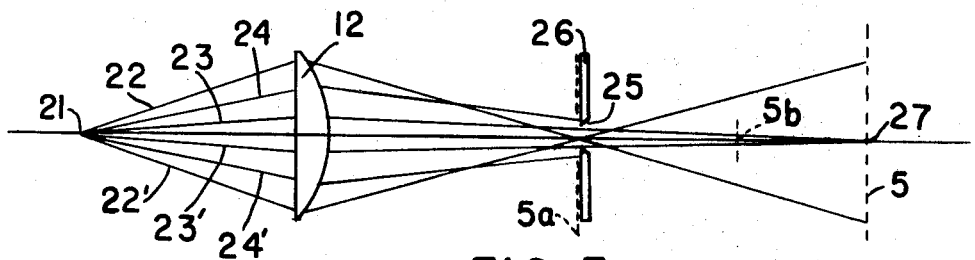
FIG. 3 illustrates the basic principle upon which the invention functions and is a schematic ray diagram for a portion of the instrument.

According to the present invention, this lens 12 is specifically designed to exhibit a relatively large amount of spherical aberration as illustrated in FIG. 3 to be described hereinafter. A beam splitter or beam divider 13 is placed at 45° as shown to the optical axis 14 of lens 12, its purpose being to direct a portion of the light transmitted by said lens toward a subject human eye 15. The front surface 15' of the subject eye 15, being a convex optical surface of relatively small radius of curvature, produces a bright minified specular reflection pattern of the aperture 11 as formed by the lens 12. This reflection patterns lies in an apparent plane within the structure of the subject eye 15. It is the character of this reflection pattern which is visualized and evaluated to accomplish the alignment of the axes of the aforesaid instrument and the subject eye 15.

A portion of the light reflected by the front surface 15' of the subject eye 15 is transmitted by the beam splitter 13 in the general direction of an optical system (not shown) to be aligned through relay lens 16. This relay lens 16 is located in such a position with respect to the subject eye 15 that the light transmitted through the beam splitter 13 from the front surface 15' of the subject eye is projected to the right of lens 16 in FIG. 1 either in collimated or uncollimated state. The position of lens 16 is determined by the optical parameters of the instrument and the particular character of the light is not a requisite for the function of the invention as will be seen in further description below.

Located to the right of lens 16 also in FIG. 1 is a telescopic periscope comprising prism 17, objective lens 18, and ocular lens 19. This periscope is arranged to collect the projected rays from the reflection pattern produced by subject eye 15 and produce a magnified image of that reflection in a plane which can be visualized by the observer's eye 20. The entire periscope is constructed so that it may be lowered to the position shown in FIG. 1 for the alignment method described herein, or raised out of the optical and mechanical paths of the instrument when subsequent functions and measurements are to the carried out.

Figure 4:
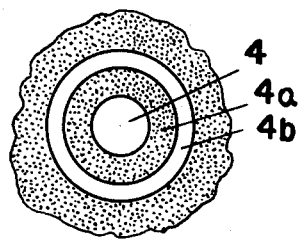
FIGS. 4 to 7 illustrate in several operating positions a typical image produced in the field of view of the instrument which effects the alignment of the two axes.
Figure 5:
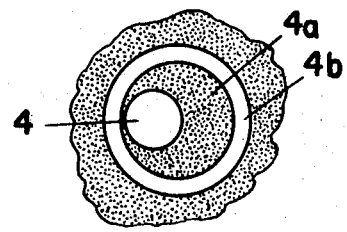
Figure 6:
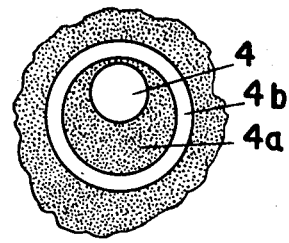
Figure 7:
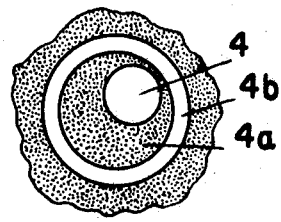

FIGS. 4 to 7 illustrate the appearance of the various patterns of the reflected image seen by the observer's eye 20 for various conditions of alignment of the instrument with respect to the visual axis of the subject eye 15. All of the patterns of the reflected image consist of a bright, circular spot of light 4, surrounded by a dark area 4a which is bordered by a larger annulus of light 4b. FIG. 4 illustrates the appearance of the image when the instrument axis 28 and the visual axis 29 of the subject eye are coincident. FIG. 5 shows a typical image appearance when the two axes 28 and 29 are misaligned horizontally. FIG. 6 shows a typical image appearance when said two axes are misaligned vertically. FIG. 7 shows a typical image appearance when the two axes are misaligned both horizontally and vertically.

As heretofore mentioned, the explanation for the appearance of said image depends on the purposeful inclusion of a high degree of spherical aberration in construction of the lens 12 as mentioned previously and the parallactic disparity of image plane 5 and 5a produced by such a lens as shown in FIG. 3. Referring to FIG. 3, a lens 12 is illustrated which exhibits a high degree of spherical aberration. Consider 21 an omnidirectional point source of light. Light rays 22 and 22' represent light passing through a peripheral zone of lens 12 and forming an image at the image plane 5a. Light rays 23 and 23' represent light passing through a paracentral zone of lens 12 and forming an image at image plane 5. Light rays 24 and 24' represent light passing through an intermediate zone of lens 12 lying between the peripheral and paracentral zones and these rays are directed toward an axial point 5b. A relatively small aperture 25 formed in a diaphragm 26 or otherwise is located in the image path of the lens 12.

Because of spherical aberrations of the lens 12, the light rays 22 and 22', 24 and 24', 23 and 23' would be focused respectively at three different points or plane 5a, 5b and 5 respectively on the image side of lens 12. The aperture 25, if placed in the plane 5a of the image formed by light rays 22 and 22', allows the light from these two rays (hence, all the peripheral zone rays) to pass through. Likewise light rays 23 and 23' (rays from the paracentral zone) also pays through and are focused at point 27 in plane 5. However, light rays from the intermediate zone, represented by rays 24 and 24' do not pass through the aperture 25. Thus, the images represented in FIGS. 4 to 7 are formed. Since the circular bright spot 4 and the annulus 4b lie in different focal planes they are concentric only when the instrument axis 28, FIG. 1, and the visual axis 29 of the subject eye 15 are coincident. In the embodiment described, the aperture 25 is effectively produced by the pupil of the observer's eye 20, it being understood that FIG. 3 may be related to FIG. 1 if it is appreciated that the beam splitter 13, the eye surface 15', the beamsplitter 13 (again), the lens 16, prism 17 and lenses 18 and 19 of FIG. 1, all intervene, relative to the diagrammatic presentation of FIG. 3, between the lens 12 and the pupil 25. The prism 17 and the lenses 16, 18 and 19, as aforesaid, comprise a well-known telescopic periscope which serves to aid the observer in perceiving the aberrated image of the aperture 11 as reflected from the surface 15'.

OPERATION OF INSTRUMENT

In order for the operator of the instrument to align the axes 28 and 29 to each other so as to obtain the ideal reflection pattern shown in FIG. 4, the parts of the instrument which are enclosed within the dotted line A as shown in FIG. 1 are moved as a unit in various directions transverse to axis 28. Means for accomplishing such transverse movements are indicated generally by the block lettered M which is connected at one side to said instrument and is connected at the other side through a support S to a base member B, said transverse movements being under control of a suitable control handle C forming part of said means.

DESCRIPTION OF A SECOND EMBODIMENT OF THE INVENTION

FIG. 2 illustrates a second embodiment of the invention which is similar to that shown in FIG. 1 but simplified in structure. It is possible in certain forms of such an instrument to place the observer eye 20 in the proper location along the instrument axis as shown in FIG. 2, thus eliminating the above-described telescopic periscope. In such a simplified instrument, only light source 30, aperture 31, lens 32, beam divider 33, and eye 15 need by present in the apparatus. The description of the operation of the invention as taught above is likewise generally valid for this second embodiment, the principal difference being the placement of the observer's eye.

It will be perceived from the foregoing description that there is here provided an optical alignment apparatus for two separate optical systems, said apparatus being simple in form although effective to accurately align said systems to each other, and although only certain forms of the invention have been shown and described in detail, other forms are possible and changes and substitutions may be made in the parts thereof without departing from the spirit of the invention as defined in the appended claims.

I claim:

1. Apparatus for accurately aligning an optical axis of an optical system having a reflecting surface with a prescribed optical axis, said apparatus comprising;

a substantially point light source, a beam divider located on said prescribed axis and optically aligned with said point light source, first lens means having large spherical aberration which is optically aligned between said point light source and beam divider for directing a beam of light from said point light source upon said reflecting surface via said beam divider, second lens means optically aligned on said prescribed axis on the opposite side of said beam divider from said optical system and aperture-defining means optically aligned with said second lens means for visualizing the relative positions of the elements of the image pattern which is reflected from said reflecting surface and which are due to said spherical aberration, and means for moving at least said point light source, beam divider, and first leans means as an aligned unit transversely with respect to the axis of said optical system to effect alignment.

2. Apparatus for accurately aligning two independent optical axes as set forth in claim 1 wherein said reflecting surface is convexly curved toward incident light from said point light source.

3. Apparatus for accurately aligning two independent optical axes as set forth in claim 1 wherein said second lens means includes a mirror located angularly on said prescribed optical axis to deviate the rays forming the image pattern laterally thereof, an objective lens optically aligned with said mirror for forming an image of said pattern, and an eyepiece lens optically aligned with said objective lens for viewing the last said image.

4. The method of aligning apparatus having a first optical axis, to an optical member having a second optical axis, said second optical axis being perpendicular to a reflecting surface, comprising the steps of:

a. generating light rays from a substantially point light source;

b. aberrating said rays with a optical element exhibiting spherical aberration, portions of said rays being peripheral, intermediate and paracentral, respectively, in relation to said aberrating optical element;

c. reflecting said aberrated rays from said reflecting surface;

d. positioning an observer's eye, said point light source and said aberrating lens in fixed relation to said first optical axis; and adjusting the position of said first optical axis and said observer's eye relative to said second optical axis and said reflecting surface until the pupil of said observer's eye is positioned to transmit said peripheral rays so that they appear to be observer substantially as an annulus, and to transmit said paracentral rays, so that they appear to the observer substantially as a point centered in said annulus.

5. Apparatus for aligning a device having a first optical axis, to an optical member having a second optical axis, said second optical axis being perpendicular to a reflective surface, comprising:
 a. a substantially point light source for generating a diverging beam of light rays;
 b. an optical member having large spherical aberration for changing said light rays from said point light source into a converging beam of light rays, said diverging rays being incident, respectively, upon peripheral intermediate and paracentral portions of said spherically aberrating optical member;
 c. means for directing said converging rays upon said reflective surface associated with said second optical axis;
 d. means for positioning an observer's eye pupil in fixed unitary relation to said first optical axis substantially in a focal plane of said peripheral rays of said spherically aberrating optical member and means for moving said device having said first optical axis as a unit with said obersver's eye pupil, to effect said alignment.

UNITED STATES PATENT OFFICE
CERTIFICATE OF CORRECTION

Patent No. 3,600,098　　　　　　　　　Dated August 17, 1971

Inventor(s) RICHARD C. MOHRMAN

It is certified that error appears in the above-identified patent and that said Letters Patent are hereby corrected as shown below:

Col. 2, line 68, change "the" to -- be --;
Col. 3, line 33, change "pays" to -- pass --;
Col. 4, line 73, change "be" to -- the --;
Col. 6, line 8, before "means" insert -- e. --

Signed and sealed this 2nd day of January 1973.

(SEAL)
Attest:

EDWARD M. FLETCHER, JR.　　　　　　　ROBERT GOTTSCHALK
Attesting Officer　　　　　　　　　　Commissioner of Patents